UNITED STATES PATENT OFFICE.

EDWARD CHARLES LUDWIG KRESSEL, OF LONDON, ENGLAND, ASSIGNOR OF TWO-THIRDS TO THOMAS HILL-JONES, OF SAME PLACE.

ALIMENTARY EXTRACT AND METHOD OF MAKING SAME.

SPECIFICATION forming part of Letters Patent No. 683,210, dated September 24, 1901.

Application filed September 13, 1897. Serial No. 651,516. (No specimens.)

*To all whom it may concern:*

Be it known that I, EDWARD CHARLES LUDWIG KRESSEL, a subject of the Queen of Great Britain, residing at London, England, have invented a new and useful Article of Manufacture, an Improved Alimentary Extract; and I do hereby declare that the following is a full, clear, and exact description of the invention, which will enable others skilled in the art to which it appertains to make and use the same.

This invention is in part covered by Letters Patent granted to me in Great Britain, No. 15,885 of 1895, and in Germany, No. 89,819, dated March 17, 1896.

In manufacturing the extract according to the present invention I take ordinary yeast, such as brewer's yeast, and wash the same, so as to remove the bitter taste therefrom—that is to say, I wash the yeast in water without the addition of any chemicals, as described in the specification of the said former patent. Other yeast than brewer's yeast may be employed, and in the case of distiller's yeast no washing is necessary.

The object of my invention is to hydrate the proteid matter contained in the protoplasm of the yeast-cells and to form peptones, and according to my present invention I do this by the aid of digestive agents or chemicals or by the action of superheated steam upon the yeast in the manner hereinafter appearing.

When I use digestive agents or chemicals I proceed as follows: I strain off the water used for the washing operation and add to the washed yeast about two and one-half per cent., by weight, of common salt (NaCl) and subject the mixture to a temperature not exceeding 60° to 65° centigrade for a space of time not less than three hours. I have found in practice that this temperature is sufficient to kill the yeast-cells, but is not high enough to coagulate all the proteids which, together with other constituents, form the real flesh-formers of our extract and without which it would hardly be of any value at all. Should the temperature to which the yeast is subjected materially exceed 65° centigrade, most of the proteid matter would be coagulated, which would render it more difficult to effect the hydration. I find it advantageous, therefore, in practice to conduct this heating operation *in vacuo*, so that the temperature can be accurately regulated. At the end of about three hours it will be found that the contents of the vacuum-pan or other heating vessel have become somewhat pasty. I then thin and dilute the same with water, cooling down the mixture to a temperature of about 40° to 45° centigrade. I add to about every thousand parts of this cooled mixture about one part of a digestive principle or agent. The addition of the digestive principle or agent effects an artificial digestion or peptonization of the contents of the yeast-cells, as coagulable and insoluble proteid matter (albumins and globulins, &c.) being soluble in gastric and pancreatic juices is thereby hydrated and converted into a variety of proteids, called "peptones."

The composition of a digestive agent which I have found to work very well is as follows, viz: Sugar of milk, twenty ounces; pepsin, four ounces; pancreatin, three ounces; ptyalin or diastase, two drams; lactic acid, two and one-half fluid drams; hydrochloric acid, two and one-half fluid drams, these ingredients making up or representing artificially the chemical components of the gastric or pancreatic juices of the digestive organs. The actual proportions of each of the constituents named may be varied to suit the different characters or qualities of yeast employed, and I have found that pepsin alone or other similar digestive agents may be employed in place of the digestive agent more particularly described. I may also in lieu of the digestive agent hereinbefore referred to add to the diluted and cooled contents of the vacuum-pan or other heating vessel the chemical substance known as "formic aldehyde." When using this substance, I add to about every thousand parts of the cooled and diluted contents of the vacuum-pan or other heating vessel about one to five parts of formic aldehyde. After adding any of the above substances I digest the mixture at a temperature of about 40° to 45° centigrade until hydration is completely effected. The action of formic aldehyde is a synthetic process only, which renders the otherwise insoluble proteids soluble and may be considered generally as the reaction whereby two hydrogen atoms of one or two amido groups are replaced by the radicle methylen $CH_2$. This reaction may be represented by the following equation:

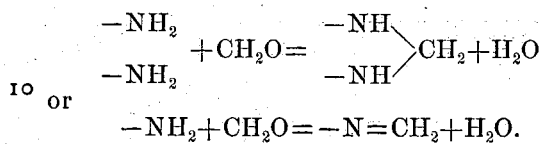

or $$-NH_2 + CH_2O = -N=CH_2 + H_2O.$$

As intermediate products in the hydration of proteids the proteoses are formed, the final products being peptones. Complete peptonization or hydration having taken place, I strain the liquor or pass it through a filter-press, so as to remove all solid matter or deposit, which now will consist only of cellulose matter or the shells of the yeast-cells. The resulting clear liquor is then condensed *in vacuo* until it attains the consistency of a paste, when it is ready to be potted or put up for use.

Having now particularly described and ascertained the nature of my said invention and in what manner the same is to be performed, I declare that what I claim is—

1. The process of preparing an alimentary extract from yeast which consists in subjecting it to a temperature which will kill the yeast-cells without coagulating all of the proteid matter, hydrating such proteid matter as is coagulated or insoluble to convert it into peptones, separating the solid matter, and condensing the resulting fluid, substantially as described.

2. The process of preparing an alimentary extract from yeast which consists in adding common salt to the yeast, subjecting it to a temperature sufficient to kill the yeast-cells without coagulating all of the proteid matter, adding a digestive material to hydrate the proteid matter and convert it into peptones removing the solid matter and condensing the liquid, substantially as described.

3. An alimentary compound prepared from yeast consisting of the contents of the yeast-cells, including substantially all of the albuminous proteid matter, converted into soluble peptones.

EDWARD CHARLES LUDWIG KRESSEL.

Witnesses:
G. F. REDFERN,
JOHN E. BOUSFIELD.